United States Patent
Rettig et al.

(10) Patent No.: US 9,667,135 B2
(45) Date of Patent: May 30, 2017

(54) MULTIPHASE DC VOLTAGE CONVERTER AND METHOD FOR CONTROLLING A MULTIPHASE DC VOLTAGE CONVERTER

(75) Inventors: Rasmus Rettig, Hamburg (DE); Werner Schiemann, Fellbach (DE); Franziska Kalb, Fichtelberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1076 days.

(21) Appl. No.: 13/514,142

(22) PCT Filed: Nov. 24, 2010

(86) PCT No.: PCT/EP2010/068101
§ 371 (c)(1),
(2), (4) Date: Aug. 17, 2012

(87) PCT Pub. No.: WO2011/080011
PCT Pub. Date: Jul. 7, 2011

(65) Prior Publication Data
US 2013/0051107 A1    Feb. 28, 2013

(30) Foreign Application Priority Data
Dec. 18, 2009  (DE) .................. 10 2009 054 957

(51) Int. Cl.
*G05F 1/325* (2006.01)
*H02M 1/40* (2007.01)
(Continued)

(52) U.S. Cl.
CPC ............. *H02M 1/40* (2013.01); *G05F 1/325* (2013.01); *H02M 3/1584* (2013.01); *H02M 2001/0009* (2013.01); *H02M 2003/1586* (2013.01)

(58) Field of Classification Search
USPC ........ 323/225, 232, 247, 250, 268, 271, 272
See application file for complete search history.

(56) References Cited

U.S. PATENT DOCUMENTS 3,683,131 A * 8/1972 Hodder et al. .................. 360/67
4,639,665 A * 1/1987 Gary ......................... 324/117 H
(Continued)

FOREIGN PATENT DOCUMENTS

CN        1639657        7/2005
JP        2003-516706    5/2003
(Continued)

OTHER PUBLICATIONS

International Search Report, PCT International Application No. PCT/EP2010/068101, dated Mar. 14, 2011. Czogalla, J., "Automotive Application of Multi-Phase Coupled-Inductor DC-DC Converter," IEEE, pp. 1524-1529 (2003).

*Primary Examiner* — Jeffrey Gblende
(74) *Attorney, Agent, or Firm* — Gerard Messina

(57) ABSTRACT

A multiphase DC voltage converter and a method for controlling a multiphase DC voltage converter, having at least two parallel coils which are controlled in a time-shifted manner, at least one control unit for activating the coils, and at least one magnetically sensitive sensor element for detecting a magnetic field generated by the current flow through the coils. The control unit controls the current flow through the coils as a function of an output signal of the at least one sensor element.

11 Claims, 3 Drawing Sheets

(51) Int. Cl.
*H02M 3/158* (2006.01)
*H02M 1/00* (2006.01)

(56) References Cited

U.S. PATENT DOCUMENTS

| | | | |
|---|---|---|---|
| 7,449,867 B2* | 11/2008 | Wu et al. ........................ | 323/247 |
| 2006/0089815 A1* | 4/2006 | Moritani ......................... | 702/85 |
| 2006/0187684 A1* | 8/2006 | Chandrasekaran et al. .... | 363/16 |
| 2006/0197510 A1* | 9/2006 | Chandrasekaran ........... | 323/222 |
| 2008/0067990 A1* | 3/2008 | Wei ................................ | 323/271 |
| 2008/0084717 A1 | 4/2008 | Wu et al. | |
| 2008/0303495 A1 | 12/2008 | Wei et al. | |
| 2008/0309299 A1* | 12/2008 | Wei et al. ...................... | 323/247 |
| 2009/0046486 A1* | 2/2009 | Lu et al. ......................... | 363/45 |
| 2009/0108821 A1* | 4/2009 | Standing ........................ | 323/272 |
| 2010/0026459 A1* | 2/2010 | Seppa .................. | G06K 7/0008 340/10.1 |

FOREIGN PATENT DOCUMENTS

| | | |
|---|---|---|
| JP | 2004-191312 | 7/2004 |
| WO | WO 01/43267 | 6/2001 |
| WO | WO 2009/037135 | 3/2009 |

\* cited by examiner

MULTIPHASE DC VOLTAGE CONVERTER AND METHOD FOR CONTROLLING A MULTIPHASE DC VOLTAGE CONVERTER

FIELD OF THE INVENTION

The present invention relates to a multiphase DC voltage converter and a method for controlling a multiphase DC voltage converter.

BACKGROUND INFORMATION

In today's as well as future electrical systems of motor vehicles, in particular hybrid or electric vehicles, high-performance DC voltage converters (frequently also referred to as DC/DC converters) are necessary to be able to regulate the energy flow between various voltage levels. Thus, in start-stop systems, for example, a voltage drop in the vehicle electrical system during starting is compensated for by a DC voltage converter. The existing cost, installation space, and weight constraints in the automotive field are taken into account by using so-called multiphase DC voltage converters. The power to be transmitted is distributed over multiple converter units or phase modules connected in parallel. The individual phase modules are preferably controlled in a phase- or time-shifted manner. As a result of the phase-shifted control, the current ripples in the superimposed output signal are significantly decreased, and the frequency of the output signal of the DC voltage converter is increased by the number of converter units which are clocked in an offset manner relative to the base clock frequency of the converter units. Costs for and volumes of output filters of the DC voltage converter may be reduced in this way.

To be able to make effective use of the above-mentioned advantage for multiphase DC voltage converters, the currents must generally be uniformly or "symmetrically" distributed over the individual converter units or phase modules.

The use of multiphase DC voltage converters having coupled coils in the automotive field is described in J. Czogalla, J. Li, C. Sullivan: Automotive Application of Multi-Phase Coupled-Inductor DC-DC Converter, 0-7803-7883-0/03, IEEE, 2003.

SUMMARY

In accordance with the present invention, a multiphase DC voltage converter is provided having at least two parallel coils which are controlled in a time-offset manner, at least one control unit for activating the coils, and at least one magnetically sensitive sensor element for detecting a magnetic field generated by the current flow through the coils, the control unit controlling the current flow through the coils as a function of an output signal of the at least one sensor element. The magnetically sensitive sensor element may be designed, for example, as a Hall sensor or as a magnetoresistive sensor, or also as a measuring coil.

In the multiphase DC voltage converter according to the present invention, magnetic feedback is achieved by detecting and evaluating the magnetic field generated in the coils, and may be used to compensate for load fluctuations, or, in the case of use of a magnet core, also to avoid saturation of the magnet core, so that a regulated output signal is generated. In addition, asymmetries in the activation or the design of the multiphase DC voltage converter may be compensated for.

According to one specific embodiment of the present invention, the at least two coils are magnetically coupled with negative feedback, i.e., configured and activated in such a way that the magnetic fields generated by current flows through the coupled coils are oppositely directed. The coils may be coupled, for example, via a shared magnet core on which the coils are situated. The magnet core has an air gap to prevent saturation of the magnet core.

When the configuration of the coils which are coupled with negative feedback, and also optionally of the magnet core and the air gap, is symmetrical, constant magnetic field components are almost completely eliminated, thus also preventing possible saturation of the magnet core. This allows the use of smaller coils and magnet cores, and thus results in smaller designs. If constant magnetic field components result despite the symmetrical configuration, for example due to component tolerances or environmental influences, they may be detected according to the present invention with the aid of the magnetically sensitive sensor and compensated for by suitable activation of the coils by the control unit.

According to another specific embodiment of the present invention, at least one magnetically sensitive sensor element is situated in the vicinity of the air gap of the magnet core. A magnetic leakage flux may be detected in this region which allows an inference of the magnetic field in the magnet core, and thus of the stored energy quantity. The coils may then be suitably activated by the control unit. In particular, the output signal of the sensor element may be evaluated as an integral over time, and an offset value may be ascertained. This offset value represents a measure for a constant magnetic flux. The control unit is then able to control the current flow through the coils in such a way that this offset value is minimized.

As an alternative to positioning the magnetically sensitive sensor element in the vicinity of the air gap, a sensor element may also be positioned in the air gap. The position is advantageously selected in such a way that an output signal without any offset results during optimal symmetrical activation of the coils.

As an alternative to providing one or also multiple sensor elements in a region of the multiphase DC voltage converter at which the sensor element detects a sum signal, i.e., a signal that is based on the magnetic fields generated by multiple coils, at least one magnetically sensitive sensor element may be situated in the surroundings of each individual coil. As a result, the sensor elements in each case deliver an output signal which characterizes a magnetic field generated by the current flow through the particular coil. The magnetic fields generated by the individual coils are evaluated separately, in a manner of speaking, when the sensor elements are positioned in this way. Of course, separate evaluation and sum evaluation may also be combined in any desired manner; i.e., sensor elements which detect individual magnetic fields may be provided in addition to other sensor elements which detect summed magnetic fields.

The at least one magnetically sensitive sensor element is advantageously integrated into a control circuit of the multiphase DC voltage converter. The control circuit also includes at least the control unit, but may also include further units, for example evaluation units for the output signals of the sensor elements. This results in a particularly simple and cost-effective implementation of the multiphase DC voltage converter according to the present invention.

Further features and advantages of specific embodiments of the present invention result from the following description, with reference to the figures.

DETAILED DESCRIPTION OF EXAMPLE EMBODIMENTS

Figure 1:
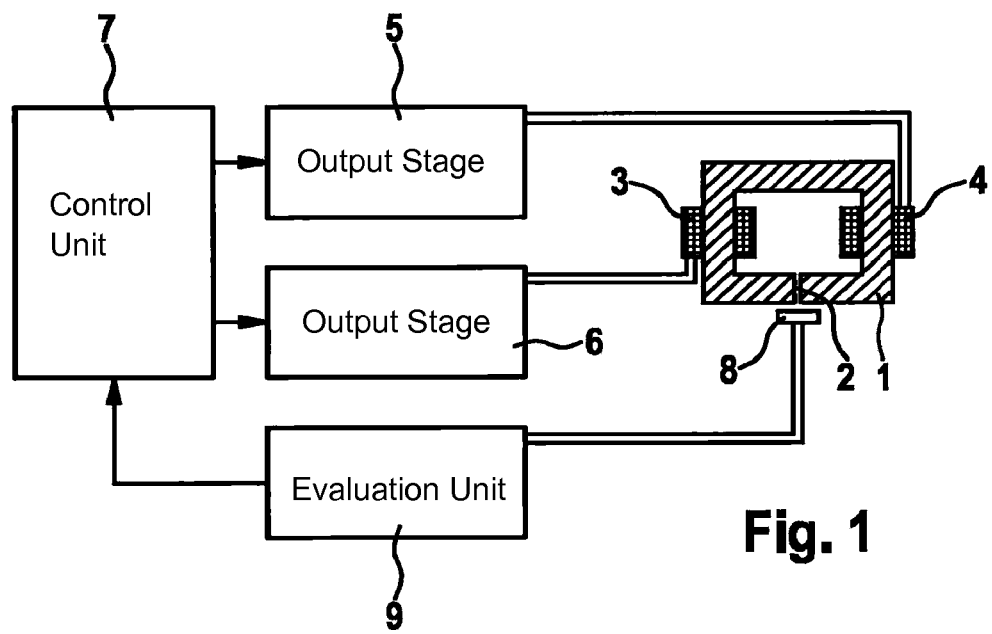
FIG. 1 shows a schematic illustration of one specific embodiment of a multiphase DC voltage converter according to the present invention, having coupled coils.

Identical or functionally equivalent components are denoted by the same reference numerals in the figures.

FIG. 1 schematically shows in a greatly simplified manner the design of a multiphase DC voltage converter according to the present invention. Two coils 3 and 4 which are each a component of a converter unit or of a phase module of the multiphase DC voltage converter are situated in parallel on a magnet core 1 which has an air gap 2. Magnet core 1 itself, the position of air gap 2, and the arrangement and position of coils 3 and 4 are advantageously configured symmetrically. The configuration of coils 3 and 4 on a shared magnet core results in a magnetic coupling of the two coils. Coils 3 and 4 are each connected to an output stage 5 and 6, respectively, each of which includes switching elements, not illustrated, for blocking or enabling a current flow through coils 3 and 4. Output stages 5 and 6 are connected to a control unit 7 which controls output stages 5 and 6, and thus the current flow through coils 3 and 4, in a time-shifted or phase-shifted manner. The configuration and activation of coils 3 and 4 are designed in such a way that coupling with negative feedback results between coils 3 and 4; i.e., the two coils generate magnetic fields having opposite orientations. When the configuration and the activation have optimal symmetry, all constant magnetic field components are eliminated as a result of the coupling with negative feedback, so that the direct component or DC component of the resulting magnetic field is zero. However, component tolerances or other environmental influences result in constant direct components, even for a symmetrical configuration and symmetrical activation, and the elimination of the constant direct components results in improved function of the multiphase DC voltage converter.

A magnetically sensitive sensor element 8, for example in the form of a Hall sensor, of a magnetoresistive sensor or of a measuring coil is situated in the vicinity of air gap 2. The output signal of sensor element 8 is transmitted to control unit 7 via an evaluation unit 9. Magnetic feedback is achieved in this way. When magnetically sensitive sensor element 8 is situated in the vicinity of air gap 2 of magnet core 1, as illustrated, sensor element 8 detects a magnetic leakage flux which allows inferences of the magnetic field within magnet core 1, and thus, of the energy quantity stored therein. Alternatively, sensor element 8 may be situated in the region of air gap 2. In that case, sensor element 8 does not detect the leakage flux, but instead outputs an output signal which directly characterizes the magnetic flux in magnet core 1. The output signal of sensor element 8 may be regarded by evaluation unit 9 as an integral over time, and on this basis an offset value of the output signal may be determined. This offset value represents a measure for an existing constant magnetic flux. Control unit 7 is then able to control coils 3 and 4 via output stages 5 and 6, respectively, in such a way that the offset value is minimized. An asymmetry of coils 3 and 4 may thus be compensated for, for example by correcting the pulse width ratio of the control signals of the two coils 3 and 4.

In the illustrated specific embodiment, control unit 7, the two output stages 5 and 6, and evaluation unit 9 are represented as separate units. Of course, these units may also be completely or partially integrated into a higher-level unit. It is also possible to provide separate control units for controlling individual output stages 5 and 6 or coils 3 and 4. A two-phase DC voltage converter is illustrated in FIG. 1 as an example. However, this system is easily expandable by further converter units or phase modules by providing additional coils having corresponding output stages and control units. Optionally, additional magnetically sensitive sensor elements are then also provided to allow the magnetic fields generated by the additional coils to be detected. The illustration of coils 3 and 4 which are coupled with the aid of a magnet core 1 is also understood to be strictly an example. Other embodiments of magnet core 1 are also possible. By a suitable configuration of the coils, a magnetic coupling of the coils may be achieved even without using a magnet core.

The present invention is also applicable to multiphase DC voltage converters having coils which are not coupled. However, it is then necessary to provide a separate magnetically sensitive sensor element for each of the coils which is situated in such a way that it is able to detect the magnetic field generated by a current flow through the particular coil. The magnetic fields of the individual coils are thus evaluated separately, in a manner of speaking, and the output signals of all sensor elements are supplied to the control unit via one or multiple evaluation units. This type of separate evaluation is alternatively or additionally applicable to systems having coupled coils.

Figure 2:
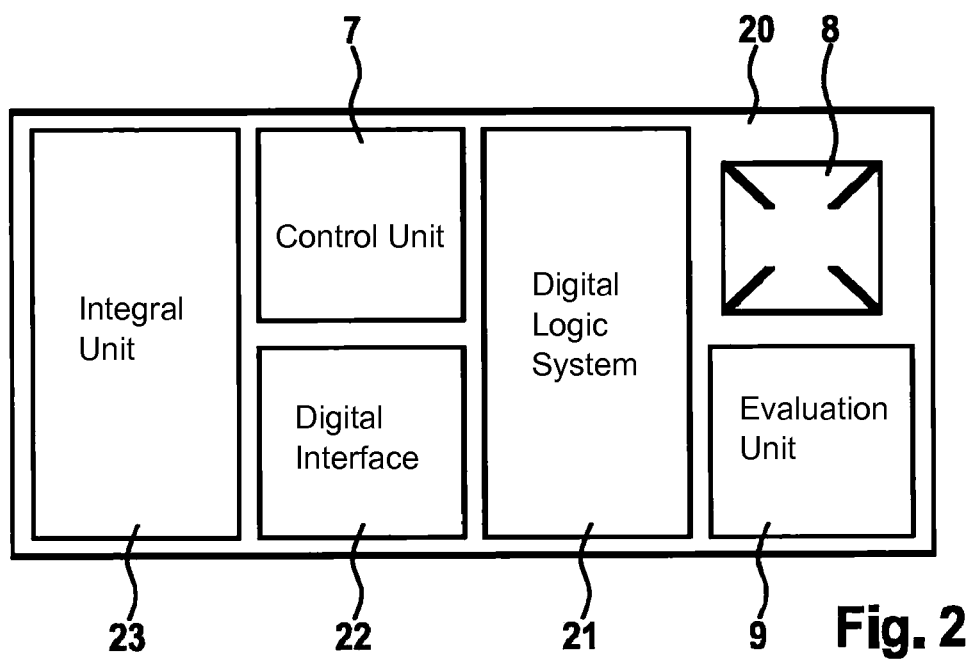
FIG. 2 shows a schematic illustration of a first specific embodiment of a control circuit for a multiphase DC voltage converter according to the present invention, having an integrated magnetically sensitive sensor element.

The magnetically sensitive sensor element(s) is/are advantageously integrated into a control circuit of the multiphase DC voltage converter. FIG. 2 shows a schematic illustration of a first specific embodiment of a control circuit having an integrated sensor element. In addition to sensor element 8, a control circuit 20 includes control unit 7, output stages 5 and 6, evaluation unit 9, and a digital logic system 21 and a digital interface 22. Output stages 5 and 6 are illustrated as an integral unit 23. Sensor element 8 is preferably situated in an edge region of control circuit 20. Control circuit 20 is then positioned in relation to the coils of the multiphase DC voltage converter in such a way that the sensor element comes to rest at the desired position, for example in the vicinity of air gap 2 of magnet core 1.

Figure 3:
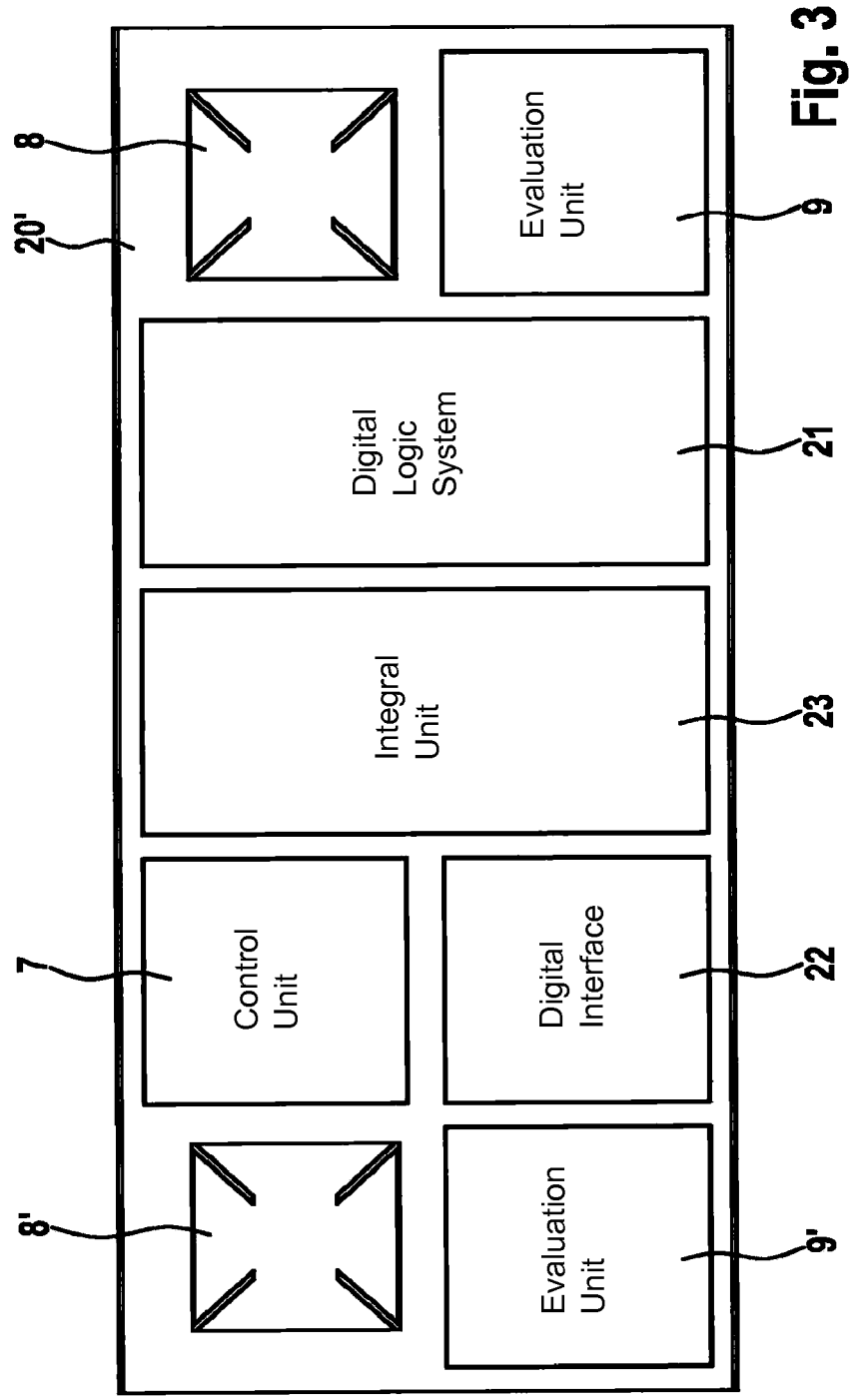
FIG. 3 shows a schematic illustration of a second specific embodiment of a control circuit for a multiphase DC voltage converter according to the present invention, having two integrated magnetically sensitive sensor elements.

FIG. 3 illustrates one alternative specific embodiment of a control circuit 20' of a multiphase DC voltage converter. This specific embodiment differs from the specific embodiment illustrated in FIG. 2 solely in that a second magnetically sensitive sensor element 8' having an associated second evaluation unit 9' is provided. Of course, in a departure from the illustrated specific embodiment, it is once again possible to process the output signals of sensor elements 8 and 8' by a shared evaluation unit. For a two-phase DC voltage converter, providing two sensor elements 8 and 8' allows separate evaluation of the magnetic fields generated by the current flow in the coils, in particular when the two sensor elements 8 and 8' are situated at a distance from one another within the control circuit 20'. This type of design of the control circuit is therefore also usable for a DC voltage converter having coils which are not coupled.

In principle, for control circuits 20 and 20' illustrated in FIGS. 2 and 3, the circuit components shown may also be combined in any desired manner in higher-level units. Likewise, additional circuit components or units may be integrated into the control circuit. Of course, additional magnetically sensitive sensor elements may also be integrated into a control unit, so that the control circuit is also usable, for example, for DC voltage converters which have more than two converter units or phase modules.

Figure 4:
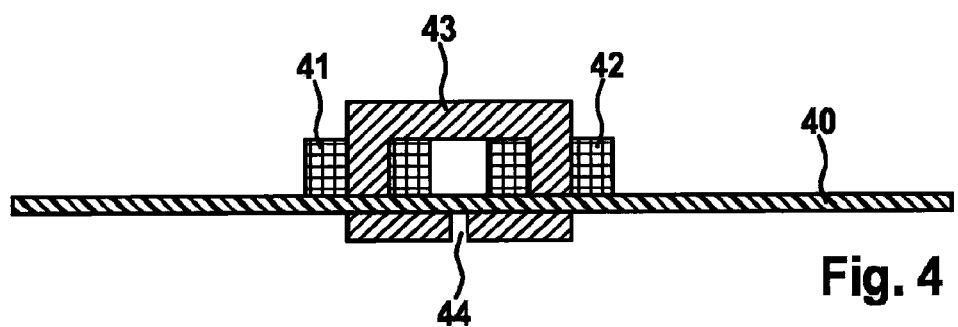
FIG. 4 shows a schematic side view of a first specific embodiment of a printed circuit having a multiphase DC voltage converter according to the present invention.

FIG. 4 shows a schematic side view of a first specific embodiment of a printed circuit having a multiphase DC voltage converter according to the present invention. As an example, the DC voltage converter is designed as a two-phase DC voltage converter having coupled coils. Two coils 41 and 42 designed using surface mounted device (SMD) technology, for example, are situated on a printed circuit board (PCB) 40. The two coils 41 and 42 are magnetically coupled via a magnet core 43 which is inserted into coils 41 and 42 according to the SMD soldering process, for example. The magnetically sensitive sensor element, not illustrated, is then positioned at a suitable location, for example in the vicinity of an air gap 44 of magnet core 43.

Figure 5:
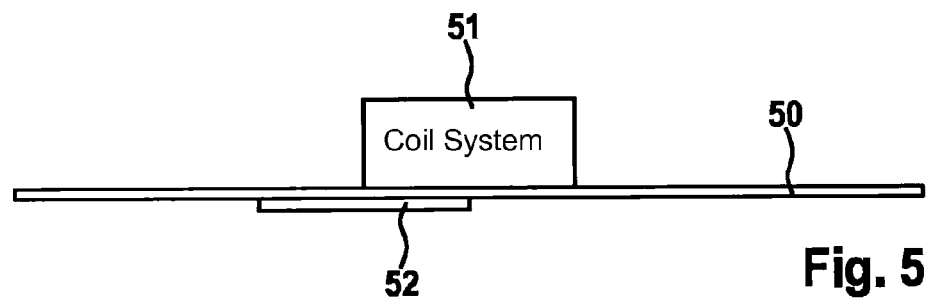
FIG. 5 shows a schematic side view of a second specific embodiment of a printed circuit having a multiphase DC voltage converter according to the present invention.

FIG. 5 shows a schematic side view of a second specific embodiment of a printed circuit having a multiphase DC voltage converter according to the present invention. A coil system 51 is situated on the top side of a printed circuit board 50. As an example, it is assumed that this coil system also involves two coils coupled via a magnet core which has an air gap. A control circuit 52 into which at least one control unit and one magnetically sensitive sensor element (neither of which is illustrated separately) are integrated is situated on the bottom side of printed circuit board 50. Control circuit 52 is implemented as an integrated circuit which is positioned in such a way that it at least partially overlaps with coil system 51, specifically, in such a way that the magnetically sensitive sensor element which is integrated into the control circuit comes to rest in a suitable position in relation to the coil system.

What is claimed is:

1. A multiphase DC voltage converter, comprising:
   a magnet core having an air gap;
   at least two parallel coils which are situated in parallel on the magnet core and are controlled in a time-shifted manner;
   at least one control unit for activating the at least two parallel coils to generate oppositely directed magnetic fields; and
   at least one magnetically sensitive sensor element in a vicinity of the air gap to detect a net magnetic field generated by current flow through the at least two parallel coils;
   wherein the control unit controls the current flow through the at least two parallel coils as a function of an output signal of the at least one sensor element and in such a way that an offset value of the output signal is minimized.

2. The multiphase DC voltage converter as recited in claim 1, wherein the at least two parallel coils are magnetically coupled with negative feedback.

3. The multiphase DC voltage converter as recited in claim 2, wherein the at least two parallel coils are magnetically coupled with negative feedback via the magnet core having the air gap.

4. The multiphase DC voltage converter as recited in claim 1, wherein the at least one magnetically sensitive sensor element is situated in the air gap of the magnet core.

5. The multiphase DC voltage converter as recited in claim 1, wherein at least one magnetically sensitive sensor element in each case is situated in the surroundings of each coil, so that the sensor elements in each case deliver an output signal which characterizes a magnetic field generated by the current flow through the coil.

6. The multiphase DC voltage converter as recited in claim 1, wherein the at least one magnetically sensitive sensor element is integrated into a control circuit of the multiphase DC voltage converter which also includes at least the control unit.

7. The multiphase DC voltage converter as recited in claim 6, wherein the control circuit also includes at least one evaluation unit for the output signal of the at least one sensor element.

8. The multiphase DC voltage converter as recited in claim 1, wherein the magnetically sensitive sensor element is one of a Hall sensor, a magnetoresistive sensor, or a measuring coil.

9. A method for controlling a multiphase DC voltage converter having at least two parallel coils which are situated in parallel on a magnet core which has an air gap and are controlled in a time-shifted manner, the method comprising:
   detecting a magnetic field generated by current flow through the at least two parallel coils with the aid of at least one magnetically sensitive sensor element in a vicinity of the air gap;
   controlling the current flow through the at least two parallel coils as a function of an output signal of the at least one sensor element and in such a way that the at least two coils generate oppositely directed magnetic fields; and
   ascertaining an offset value based on the output signal of the at least one magnetically sensitive sensor element, wherein the current flow through the at least two parallel coils is controlled in such a way that the offset value is minimized.

10. The multiphase DC voltage converter as recited in claim 7, wherein the at least one evaluation unit ascertains the offset value by a time integral of the output signal of the at least one sensor element.

11. The method as recited in claim 9, wherein the offset value is ascertained by a time integral of the output signal of the magnetically sensitive sensor element.

\* \* \* \* \*